US012444560B2

(12) United States Patent
Hofsaess

(10) Patent No.: US 12,444,560 B2
(45) Date of Patent: Oct. 14, 2025

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 178 days.

(21) Appl. No.: 18/448,565

(22) Filed: Aug. 11, 2023

(65) Prior Publication Data

US 2024/0055204 A1 Feb. 15, 2024

(30) Foreign Application Priority Data

Aug. 12, 2022 (DE) ......................... 102022120447.2

(51) Int. Cl.
*H01H 37/54* (2006.01)
*H01H 37/64* (2006.01)

(52) U.S. Cl.
CPC ........ *H01H 37/5427* (2013.01); *H01H 37/64* (2013.01)

(58) Field of Classification Search
CPC ............... H01H 37/5427; H01H 37/64; H01H 37/5409; H01H 37/04; H01H 2037/5481; H01H 37/52
See application file for complete search history.

(56) References Cited

U.S. PATENT DOCUMENTS 5,615,072 A * 3/1997 Hofsass ............. H01H 37/5427 361/105
5,757,261 A 5/1998 Becher et al.
(Continued)

FOREIGN PATENT DOCUMENTS

DE 195 27 253 A1 1/1997
DE 10 2011 108 660 B3 11/2012
(Continued)

OTHER PUBLICATIONS

Search Report issued in corresponding Germany Application No. 23189391.8 dated Jan. 17, 2024.

*Primary Examiner* — Stephen S Sul
(74) *Attorney, Agent, or Firm* — Knobbe, Martens, Olson & Bear, LLP

(57) ABSTRACT

Temperature-dependent switch, comprising a temperature-dependent switching mechanism having a switching mechanism unit, which comprises a movable contact part coupled to a bimetallic snap-action disc, and having a switching mechanism housing, in which the switching mechanism unit is arranged and held captively therein. Furthermore, the switch comprises a switch housing, in which the switching mechanism housing is arranged and held captively therein, wherein the switch housing comprises a stationary contact part, which acts as a mating contact to the movable contact part. The switching mechanism housing comprises an electrically conductive first base body and the switching mechanism is configured so as, below a response temperature of the bimetallic snap-action disc, to keep the switch in a low-temperature position in which the switching mechanism establishes a first electrical connection via the movable contact part between the first base body and the stationary contact part, and, if the response temperature is exceeded, to bring the switch into a high-temperature position in which the switching mechanism interrupts the first electrical connection. The switch further comprises a PTC component, which is electrically connected parallel to the first electrical connection.

14 Claims, 2 Drawing Sheets

(56) References Cited

U.S. PATENT DOCUMENTS

| | | | | |
|---|---|---|---|---|
| 6,031,447 | A * | 2/2000 | Hofsass | H01H 37/5427 337/365 |
| 10,256,061 | B2 | 4/2019 | Neumann | |
| 10,439,196 | B2 | 10/2019 | Bourns et al. | |
| 10,985,552 | B2 | 4/2021 | Tada et al. | |
| 11,004,634 | B2 | 5/2021 | Namikawa | |
| 11,239,037 | B2 | 2/2022 | Namikawa | |
| 11,329,325 | B2 | 5/2022 | Namikawa | |
| 11,373,826 | B2 | 6/2022 | Namikawa | |
| 11,551,895 | B2 | 1/2023 | Namikawa | |
| 11,615,930 | B2 | 3/2023 | Namikawa | |
| 11,636,991 | B2 | 4/2023 | Miyata | |
| 11,651,922 | B2 | 5/2023 | Tada et al. | |
| 2013/0127586 | A1* | 5/2013 | Hofsaess | H01H 1/58 337/365 |
| 2015/0109092 | A1* | 4/2015 | Neumann | H01H 37/54 337/365 |
| 2019/0393696 | A1* | 12/2019 | Tada | H01M 50/583 |
| 2020/0168417 | A1* | 5/2020 | Hofsaess | H01H 37/5436 |
| 2020/0234898 | A1 | 7/2020 | Namikawa | |
| 2020/0343064 | A1* | 10/2020 | Hofsaess | H01H 37/04 |

FOREIGN PATENT DOCUMENTS

| | | | |
|---|---|---|---|
| DE | 102013102006 | A1 | 8/2014 |
| DE | 102013017232 | A1 | 4/2015 |

* cited by examiner

TEMPERATURE-DEPENDENT SWITCH

CROSS-REFERENCE TO RELATED APPLICATIONS

This application claims priority from German patent application DE 10 2022 120 447.2, filed on Aug. 12, 2022. The entire content of this priority application is incorporated herein by reference.

BACKGROUND

This disclosure relates to a temperature-dependent switch.

An exemplary temperature-dependent switch is disclosed in DE 10 2013 102 006 A1.

Temperature-dependent switches of this type are used in a manner known per se to monitor the temperature of a device. For this purpose, for example, the switch is brought via one of its outside surfaces into thermal contact with the device to be protected, and therefore the temperature of the device to be protected influences the temperature of the switching mechanism arranged inside the switch.

Here, the switch is typically electrically connected in series via connecting lines to the supply current circuit of the device to be protected, and therefore, below the response temperature of the switch, the supply current of the device to be protected flows through the switch.

The switch disclosed in DE 10 2013 102 006 A1 comprises a switch housing, in the interior of which a switching mechanism is hermetically sealed. The switch housing is constructed in two parts. It comprises a lower part composed of electrically conductive material and a cover part which is produced from an insulating material or a PTC thermistor material (PTC material). The cover part is inserted into the lower part and is held by an upper bent-over edge of the lower part. The switching mechanism is clamped between the cover part and the lower part. The switching mechanism is firstly inserted loosely into the lower part when the switch is manufactured. The cover part is then placed thereon and firmly connected to the lower part.

The temperature-dependent switching mechanism arranged in the switch housing comprises a bimetallic snap-action disc, which is fastened to a movable contact part. Said bimetallic snap-action disc is responsible for the temperature-dependent switching behaviour of the switch. It ensures that, at low temperatures, the switching mechanism establishes an electrically conductive connection between the movable contact part of the switching mechanism and a stationary contact part which is arranged on the cover part and acts as a mating contact to the movable contact part. By contrast, at higher temperatures, the bimetallic snap-action disc interrupts this electrical contact by ensuring that the movable contact part is lifted off the stationary contact part.

The bimetallic snap-action disc is usually formed as a multi-layered, active, sheet-like component consisting of two, three or four interconnected component parts having different thermal coefficients of expansion. In the case of bimetallic snap-action discs of this type, the connections of the individual layers of metals and metal alloys are usually integrally bonded or form-fitting and are achieved, for example, by rolling.

A bimetallic snap-action disc of this type has a first stable geometric configuration (low-temperature configuration) at low temperatures, below the response temperature of the bimetallic snap-action disc, and a second stable geometric configuration (high-temperature configuration) at high temperatures, above the response temperature of the bimetallic snap-action disc. The bimetallic snap-action disc jumps from its low-temperature configuration to its high-temperature configuration depending on the temperature in the manner of hysteresis. This process is often referred to as "snapping-over", which is also the reason for the term "snap-action disc".

If no switch-back lock is provided, the bimetallic snap-action disc snaps back into its low-temperature configuration, with the result that the switch is closed again when the temperature of the bimetallic snap-action disc drops below what is referred to as the spring-back temperature of the bimetallic snap-action disc as a result of the cooling of the device to be protected.

However, depending on the application, such a switching back may be undesirable. For safety reasons, it may be necessary, for example, for the switch to be configured in such a way that it does not close automatically again after a temperature-induced opening of the switch when the device to be protected cools down again. For example, the switch is intended to be able to be closed again only after the device to be protected has not only cooled down, but has also been completely removed from the power supply.

What is referred to as a self-holding function has been developed for such cases. For the switch disclosed in DE 10 2013 102 006 A1, this self-holding or self-holding function is brought about by the fact that the cover part of the switch is made from a PTC material (Positive Temperature Coefficient Thermistor or PTC thermistor).

As long as the switch is in its low-temperature position and is closed, no current flows through the PTC material connected as a parallel resistor. However, when the switch opens, a low self-holding current flows through the parallel resistor, which heats the latter up and ensures that the switch remains at a temperature above the response temperature of the bimetallic snap-action disc. The self-holding current is so low here that the electrical device to be protected does not suffer any further damage, and therefore it can cool down. The self-holding resistance caused by the PTC element prevents the switch itself from also cooling down again and accordingly switching on again, which without the parallel resistance would lead to an iterative switching on and off of the electrical device to be protected.

The switch disclosed in DE 10 2013 102 006 A1 has a manufacturing-related disadvantage. This disadvantage is due to the fact that the bimetallic snap-action disc is inserted together with the movable contact part as a loose individual part into the switch housing. Only by closing the switch housing is the bimetallic snap-action disc then fixed in its position and its position defined relative to the other components of the switching mechanism. However, the position of such a switch, in which the bimetallic snap-action disc is used individually, has proved to be relatively cumbersome, since a plurality of steps are necessary for inserting the switching mechanism into the switch housing.

In addition, the storage of the switching mechanism or the individual parts of the switching mechanism is cumbersome. For example, bulk material storage of the switching mechanism individual parts is hardly worth considering, since said individual parts, especially the bimetallic snap-action disc, are relatively susceptible to damage. If such damage occurs during storage, a resulting malfunction of the switching mechanism is usually only detected when the switch is assembled, since functional testing of the switching mechanism is hardly possible beforehand.

SUMMARY

It is an object to provide a temperature-dependent switch with a self-holding function, which is overall easier to produce. Among other things, it would be desirable if the switching mechanism could be produced in advance as a semi-finished product, without being susceptible to damage in the process. It would also be desirable if functional testing could be carried out with the switching mechanism even prior to its final installation in the switch. In addition, the switch is intended to be able to be comparatively easy to mount, to have a low overall height and to be pressure-stable.

According to an aspect, a temperature-dependent switch is presented which comprises the following components:

a temperature-dependent switching mechanism having a switching mechanism unit, which comprises a movable contact part coupled to a bimetallic snap-action disc, and having a switching mechanism housing, in which the switching mechanism unit is arranged and held captively therein; and a switch housing, in which the switching mechanism housing is arranged and held captively therein, wherein the switch housing comprises a stationary contact part, which acts as a mating contact to the movable contact part;

wherein the switching mechanism housing surrounds the switching mechanism unit from a first housing side, a second housing side opposite the first housing side, and a housing circumferential side extending between and transversely to the first and the second housing sides, and on the first housing side comprises an opening through which the movable contact part interacts with the stationary contact part, wherein the switching mechanism housing comprises an electrically conductive first base body and the switching mechanism is configured so as, below a response temperature of the bimetallic snap-action disc, to keep the switch in a low-temperature position in which the switching mechanism establishes a first electrical connection via the movable contact part between the first base body and the stationary contact part, and, if the response temperature is exceeded, to bring the switch into a high-temperature position in which the switching mechanism interrupts the first electrical connection, and wherein the switch further comprises a PTC component, which is electrically connected parallel to the first electrical connection.

The presented switch comprises a PTC component (PTC thermistor component), which is electrically connected parallel to the switching mechanism unit. More specifically, the PTC component is electrically connected parallel to the first electrical connection, which is brought about by the switching mechanism in the low-temperature position of the switch. The PTC component thus fulfils a self-holding function of the switch which, after a one-time, temperature-induced opening, holds the switch in its high-temperature position, in which the switching mechanism interrupts the first electrical connection, even when the device to be protected by the switching mechanism cools down again. In the high-temperature position of the switch, the current namely flows through the PTC component, which is thereby caused to heat up. The resulting heat leads to the switching mechanism not cooling down and accordingly also not closing the switch again or bringing the latter into its low-temperature position.

In contrast to the switch disclosed in DE 10 2013 102 006 A1, the herein presented switch is constructed in a simpler manner. In particular, the installation thereof can thus be achieved more easily, in fewer steps.

The switch comprises a switching mechanism, which comprises an additional switching mechanism housing, in which the switching mechanism unit, which comprises the bimetallic snap-action disc and the movable contact part, is held captively. The switching mechanism housing surrounds the switching mechanism unit namely both from a first housing side and from a second housing side opposite the first housing side, and also from a housing circumferential side extending between and transversely to the first and the second housing sides. The switching mechanism housing thus surrounds the switching mechanism unit from all six spatial directions at least partially in each case, and therefore the switching mechanism cannot drop out of the switching mechanism housing.

The switching mechanism, including the switching mechanism unit and including the switching mechanism housing surrounding the switching mechanism unit, can therefore be produced in advance as a semi-finished product before being inserted into the switch housing. The switching mechanism, which is produced in advance as a semi-finished product, can be stored as bulk material. During this bulk material storage, the various components of the switching mechanism unit, in particular the bimetallic snap-action disc and the movable contact part, are protected by the switching mechanism housing. Damage to these various components during the bulk material storage is substantially excluded, since the various components of the switching mechanism unit are securely encapsulated in the switching mechanism housing.

However, the switching mechanism housing not only affords the advantage of secure storage of the switching mechanism unit arranged therein; it also enables a substantially simple way of producing the temperature-dependent switch. Unlike a conventional switch housing, the switching mechanism housing which is now additionally provided is not a closed housing in which the switching mechanism is hermetically sealed, but rather a partially open housing which comprises an opening on the first housing side, through which the movable contact part is accessible from outside the switching mechanism housing. The switching mechanism can thus be inserted together with the switching mechanism housing as a unit into a simply constructed surrounding switch housing which forms the final switch housing.

In the production of the temperature-dependent switch, the switching mechanism together with its switching mechanism housing can thus firstly be produced in advance as a semi-finished product and then inserted as a whole into the switch housing. This not only greatly simplifies the storage of the switching mechanism, but also the production of the temperature-dependent switch.

As already mentioned, the switching mechanism housing is a partially open housing. While the second housing side and the housing circumferential side of the switching mechanism housing are preferably each closed housing sides, the first housing side is only a partially closed or a partially open housing side because of the aforementioned opening.

The partially open first housing side of the switching mechanism housing is concealed by the switch housing, which acts as the lower part of the switch. The movable contact part interacts directly with the stationary contact part, which is arranged on the switch housing, through the opening in the switching mechanism housing. In the low-temperature position of the switch, the movable contact part contacts the stationary contact part through the opening in the switching mechanism housing.

Overall, this thus results in a switch that is simply constructed from relatively few components and can be produced in comparatively few working steps. The switching mechanism used in the switch can be produced in advance together with the switching mechanism housing and stored as bulk material. The housing of the switch, which is constructed from the switch housing and the switching mechanism housing, is comparatively pressure-stable and can nevertheless be relatively compact/space-saving. The PTC component is used to realize a self-holding function of the switch, which prevents a switch back into the low-temperature position of the switch after a one-time switching over into the high-temperature position, as long as a voltage is applied to the switch or to the device to be protected by the switch.

The aforementioned object is thus completely achieved.

According to a refinement, the PTC component is arranged in the switch housing.

This not only has the advantage of a compact switch design, but also the advantage that the PTC component is therefore arranged in a manner ideally protected inside the switch.

According to a further refinement, the switch housing comprises an electrically conductive second base body, which is connected to the first base body via the PTC component, wherein the second base body surrounds the first housing side and the housing circumferential side of the switching mechanism housing.

The switching mechanism housing is preferably composed of an electrically conductive material. In other words, the first base body preferably forms the switching mechanism housing.

The switch housing is preferably composed of an electrically conductive material. In other words, the second base body preferably forms the switch housing.

Both the switch housing and the switching mechanism housing can thus act as external electrical connections of the switch. As long as the switch is in its low-temperature position, the current flows from the switch housing to the switching mechanism housing via the switching mechanism, or vice versa from the switching mechanism housing to the switch housing via the switching mechanism.

When the switch is open, i.e. in the high-temperature position of the switch, the first electrical connection is interrupted by the switching mechanism, and therefore the electrical current between the switch housing and the switching mechanism housing can only flow via the PTC component.

Since the PTC component is already heated in this case, it has a relatively high resistance, and therefore only a very low self-holding current can flow through the PTC component and thus through the switch. At the same time, the PTC component continues to heat up as a result such that the switch is held in its high-temperature position.

According to a further refinement, the first housing side of the switching mechanism housing abuts the PTC component.

Preferably, the switching mechanism housing rests with its first housing side on the PTC component from above. The PTC component forms an intermediate layer which is arranged between the switching mechanism housing and the switch housing. This ensures a very compact and extremely pressure-stable design of the switch.

According to a further refinement, the electrically conductive first base body of the switching mechanism housing forms at least part of the second housing side of the switching mechanism housing. This part of the second housing side forms a freely accessible outside of the switch.

The aforementioned part of the first base body, which forms part of the second housing side of the switching mechanism housing, is not surrounded by the switch housing when the switch is fully installed. Thus, this part of the switching mechanism housing can serve as a direct electrical outer connection surface of the switch.

The aforementioned part of the first base body of the switching mechanism housing, which forms a freely accessible outside of the switch, preferably comprises an outwardly arched, domed or pot-shaped portion. This domed or pot-shaped portion of the switching mechanism housing preferably protrudes at least in part from the switch housing. At this juncture, the term "arched outwards" means that the domed or pot-shaped portion is arched outwards from the view of the switch housing, i.e. from the inside of the switch housing. The outside of the switch is arched convexly at this point.

This refinement of the switching mechanism housing makes the switch extremely pressure-stable. In addition, the domed or pot-shaped portion can be used very easily as the outer connection surface of the switch.

According to a further refinement, the switching mechanism housing is integrally formed in one piece.

The switching mechanism housing is thus constructed in a conceivably simple way from just one part. It is preferably composed of metal. This metal forms the electrically conductive first base body, which at least partially surrounds the switching mechanism unit from all sides and comprises the aforementioned opening on the first housing side.

According to a further refinement, the temperature-dependent switch further comprises an insulator, which is arranged between the first base body and the second base body and lies on the first base body and on the second base body.

This insulator electrically insulates the two basic bodies from each other. The insulator ensures that an electrically conductive connection is established between the two basic bodies via the switching mechanism unit in the low-temperature position of the switch. In the high-temperature position of the switch, the two electrically conductive basic bodies are connected to each other only via the PTC component, and otherwise are electrically isolated from each other.

According to a further refinement, the insulator comprises an annular body, which lies with its inside on the housing circumferential side of the switching mechanism housing and lies with its outside on an inner circumferential surface of the switch housing.

Preferably, the insulator is an annular body. This annular body can be configured in a circular ring shape, as viewed in top view. However, when viewed in top view, the annular body may in principle also have a polygonal outer contour. The term "annular body" should therefore be understood as meaning in general. It refers to any bodies that have a closed contour on the circumferential side. For example, the outer contour, as viewed in top view, may thus also be elliptically or have any free form. The annular body does not necessarily have to be hollow-cylindrical or toroidal, although this is preferred.

The design of the insulator as an annular body has the advantage that the insulator electrically insulates the switching mechanism housing around the entire circumference from the switch housing. In addition, such an annular body can be arranged in a space-saving manner in the switch housing. The annular body is moreover preferably solid, and therefore the insulator forms a mechanically stable component of the switch, which can also serve to support other components of the switch and is easy to handle during the installation of the switch. The annular body of the insulator thus automatically also ensures correct alignment of the switching mechanism, in particular of the associated movable contact part, with respect to the stationary contact part, which is arranged on the switch housing.

The annular body of the insulator preferably lies with its underside on the PTC component. During the installation of the switch, the annular body of the insulator is preferably placed onto the PTC component before the switching mechanism housing is inserted into the switch housing. As already mentioned, it ensures that the switching mechanism housing is correctly aligned relative to the switch housing during the installation.

According to a further refinement, a diameter of the opening is smaller than a diameter of the bimetallic snap-action disc measured parallel thereto.

The bimetallic snap-action disc is thus securely held in the switching mechanism housing and cannot be detached from it even in the event of corresponding shaking.

According to a further refinement, the bimetallic snap-action disc is configured to snap over from a geometrically stable low-temperature configuration into a geometrically stable high-temperature configuration when the response temperature is exceeded, wherein the bimetallic snap-action disc is supported in its high-temperature configuration on a supporting surface, which is arranged on the first housing side of the switching mechanism housing and is formed on the first base body, and, in the process, keeps the movable contact part at a distance from the stationary contact.

Since the switching mechanism unit is encapsulated in the switching mechanism housing and the bimetallic snap-action disc is supported in its high-temperature configuration on said supporting surface inside the switching mechanism housing, functional testing of the switching mechanism can also already be carried out when the switching mechanism is produced in advance as a semi-finished product, i.e. even before the switching mechanism is installed in the switch housing and the switch is completely installed. The bimetallic snap-action disc can namely already then take up its two temperature-dependent configurations inside the switching mechanism housing.

This is not possible in the case of conventional switches, since the bimetallic snap-action disc is supported in its high-temperature configuration on the switch housing due to the absence of the now specially provided switching mechanism housing, and therefore functional testing is only possible when the switch is fully installed.

According to a further refinement, the switching mechanism unit further comprises a snap-action spring disc which is coupled to the movable contact part and is supported in the low-temperature position of the switch on an internal surface arranged on the second housing side in the interior of the switching mechanism housing. Said inner surface is preferably an inner surface of the electrically conductive first base body of the switching mechanism housing.

The additional provision of such a snap-action spring disc has in particular the advantage that the bimetallic snap-action disc is relieved of load as a result. In the low-temperature position of the switch, i.e. when the current circuit is closed via the switch, the snap-action spring disc serves as a live component according to this refinement. The bimetallic snap-action disc, on the other hand, is then not a live component.

In addition, in the low-temperature position of the switch, the snap-action spring disc generates the closing pressure with which the movable contact part is pressed against the stationary contact part. The bimetallic snap-action disc, on the other hand, can be mounted virtually without any force in the low-temperature position of the switch. This has a positive effect on the service life of the bimetallic snap-action disc and ensures that the switching point, i.e. the response temperature of the bimetallic snap-action disc, does not change even after many switching cycles.

According to a further refinement, an intermediate space extending circumferentially between the switching mechanism housing and the switch housing is filled with insulating compound. Preferably, the insulating compound is a lacquer with which the intermediate space between the switching mechanism housing and the switch housing is cast.

This seals the inside of the switch, in which the switching mechanism is located, extremely well. In addition, the insulating and sealing compound ensures a mechanically stable fastening of the switching mechanism housing in the switch housing.

It is understood that the features mentioned above and features yet to be discussed below may be used not only in the respectively specified combination but also in other combinations or individually without departing from the spirit and scope of the present disclosure.

DESCRIPTION OF PREFERRED EMBODIMENTS

Figure 1:
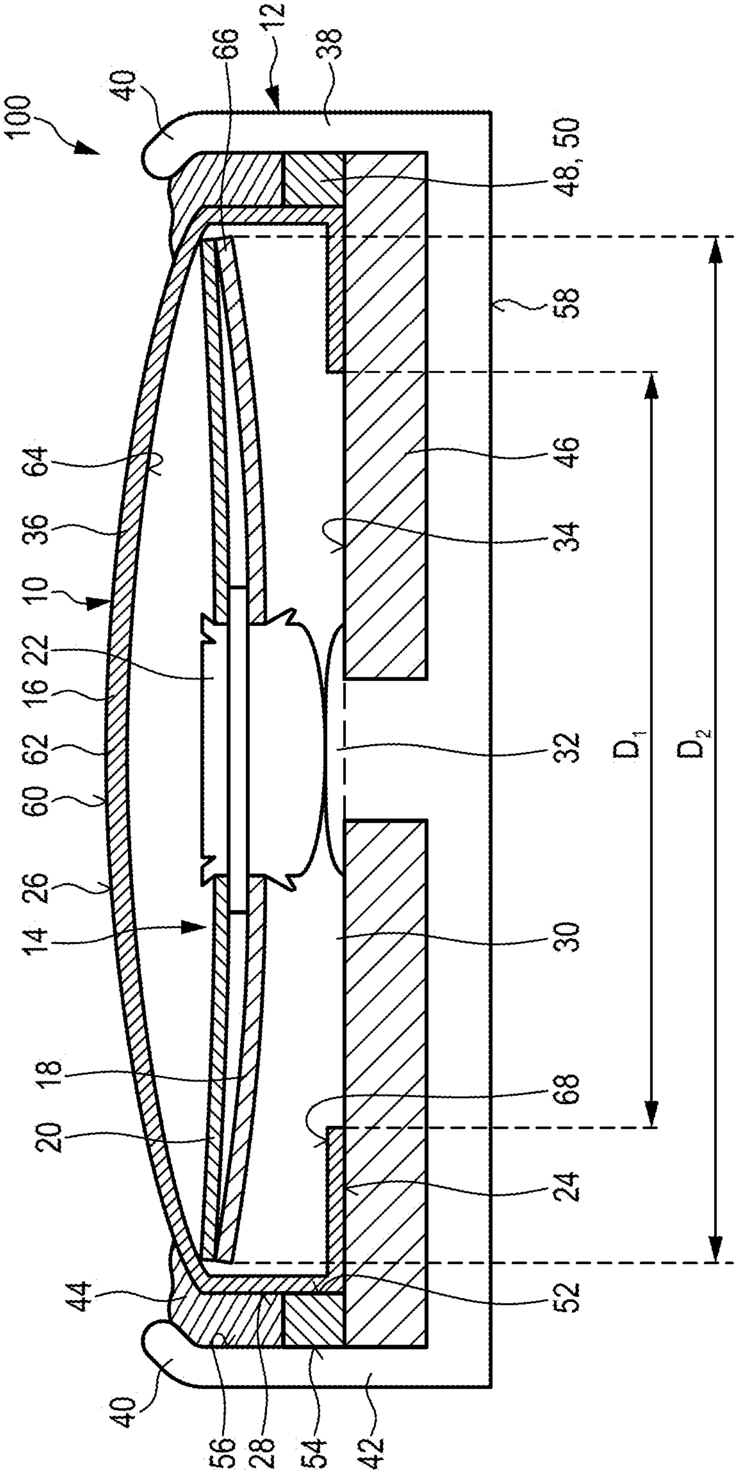
FIG. 1 shows a schematic sectional view of the temperature-dependent switch according to an exemplary embodiment, the switch being shown in its low-temperature position.
Figure 2:
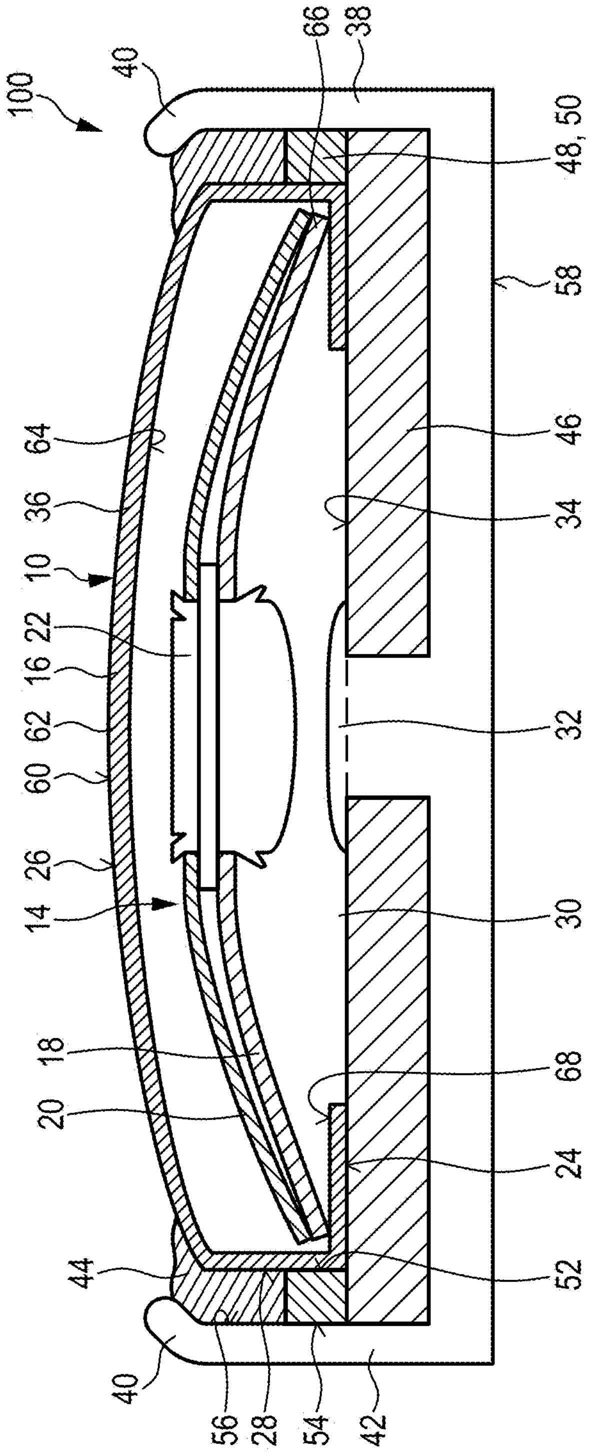
FIG. 2 shows a schematic sectional view of the switch shown in FIG. 1, the switch being shown in its high-temperature position.

FIGS. 1-2 show an exemplary embodiment in each case in a schematic sectional view. The switch is identified therein in its entirety in each case by the reference number 100.

The switch 100 comprises a temperature-dependent switching mechanism 10, which is arranged in an electrically conductive switch housing 12.

The switching mechanism 10 comprises a functional switching mechanism unit 14 and a switching mechanism housing 16 surrounding said switching mechanism unit 14. The switching mechanism housing 16 at least partially surrounds the switching mechanism unit 14 from all six spatial directions.

As explained in detail below, the switching mechanism housing 16 is a partially open housing, and therefore the switching mechanism unit 14 is accessible from outside the switching mechanism housing 16 from at least one spatial direction, preferably from only one spatial direction.

Owing to the fact that the switching mechanism housing 16 at least partially surrounds the switching mechanism unit 14 from all six spatial directions, the switching mechanism unit 14 is held captively in the switching mechanism housing 16. The switching mechanism unit 14 therefore cannot be detached from the switching mechanism housing 16.

As long as the switching mechanism 10 is not installed in the switch 100 or its switch housing 12, there is preferably a certain clearance between the switching mechanism unit

14 and the switching mechanism housing 16. However, the switching mechanism unit 14 is firmly braced in the installed state of the switch 100 shown in FIG. 1. In the low-temperature position of the switch 100 that is shown in FIG. 1, the switching mechanism unit 14 is clamped between the switch housing 12 and the switching mechanism housing 16.

The switching mechanism unit 14 is constructed in three parts according to the present exemplary embodiment. The switching mechanism unit 14 comprises a temperature-dependent bimetallic snap-action disc 18, a temperature-independent snap-action spring disc 20 and a movable contact part 22. The bimetallic snap-action disc 18 and the snap-action spring disc 20 are held captively on the contact part 22. The switching mechanism unit 14 can thus be produced in advance as a semi-finished product and then inserted as a whole into the switching mechanism housing 16.

The switching mechanism 10 together with the switching mechanism unit 14 and the switching mechanism housing 16 also form a semi-finished product for the temperature-dependent switch 100 produced from it later on. Since the three components 18, 20, 22 of the switching mechanism unit 14 are connected captively to one other and the switching mechanism unit 14 is held captively in the switching mechanism housing 16, the switching mechanism 10 can be kept in stock as bulk material until it is installed in the temperature-dependent switch 100.

The switching mechanism housing 16 surrounds the switching mechanism unit 14 from a first housing side 24, from a second housing side 26 opposite the first housing side 24, and also from a housing circumferential side 28 extending between and transversely to the first and the second housing sides 24, 26.

Preferably, the switching mechanism housing 16 completely surrounds the switching mechanism unit 14 both from the second housing side 26 and from the housing circumferential side 28. The second housing side 26 and the housing circumferential side 28 thus preferably form closed housing sides of the switching mechanism housing 16. Only the first housing side 24 is a partially open housing side of the switching mechanism housing 16.

In other words, the housing circumferential side 28 surrounds the switching mechanism unit 14 along the entire circumference, i.e. from a total of four spatial directions oriented orthogonally with respect to one other. Furthermore, the switching mechanism housing 16 completely surrounds the switching mechanism unit 14 from a further spatial direction, namely from a spatial direction oriented orthogonally to the second housing side 26. Only from the sixth spatial direction, which is oriented orthogonally to the first housing side 24, does the switching mechanism housing 16 only partially surround the switching mechanism unit 14.

On the first housing side 24, the switching mechanism housing 16 comprises an opening 30 through which the movable contact part 22 is accessible from outside the switching mechanism housing 16. Through said opening 30 in the switching mechanism housing 16, the movable contact part 22 of the switching mechanism 10 interacts with a stationary contact part 32. The stationary contact part 32 is arranged on an inner side 34 of the switch housing 12.

In the exemplary embodiment shown in FIG. 1, the stationary contact part 32 is formed in one piece with the switch housing 12. In principle, however, it would also be possible to provide the stationary contact part 32 as a kind of rivet, which is connected as a separate component to the switch housing 12. An electrically conductive connection should be established between the switch housing 12 and the stationary contact part 32.

A diameter D1 of the opening 30 is smaller than a diameter D2, measured parallel thereto, of the bimetallic snap-action disc 18 and/or of the snap-action spring disc 20. Thus, although the movable contact part 22 is accessible from outside the switching mechanism housing 16 through the opening 30, the bimetallic snap-action disc 18 and the snap-action spring disc 20 cannot become detached from the switching mechanism housing 16 or emerge therefrom.

The switching mechanism housing 16 comprises a base body 36, which is formed from an electrically conductive material, for example, from metal. This base body 36 is referred to herein as the "first base body". The electrically conductive first base body 36 forms the entire switching mechanism housing 16 in the exemplary embodiment shown here. In this exemplary embodiment, the switching mechanism housing 16 is thus formed in one piece from an electrically conductive material.

An upper part of the first base body 36, which forms the second housing side 26, simultaneously forms a freely accessible outside of the switch 100. The first housing side 24 and the housing circumferential side 28 are arranged completely within the switch housing 12 and are therefore not accessible from outside the switch 100.

The switch housing 12 consists of an electrically conductive second base body 38. The second base body 38 is preferably also composed of metal. The second base body 38 forms the lower part of the switch 100, in which the remaining components of the switch 100 are arranged.

The second base body 38 is preferably pot-shaped. An upper edge 40 of the raised, circumferential wall 42 of the second base body 38 of the switch housing 12 is folded over or crimped towards the centre of the switch 100 so that the switching mechanism 10 is held captively in the switch housing 12. The intermediate space running circumferentially between the switching mechanism housing 16 and the switch housing 12 is filled with an insulating compound 44. The insulating compound 44 is preferably an impregnating varnish, which is poured into the intermediate space between the switch housing 12 and the switching mechanism housing 16 at the end of the installation of the switch 100.

The insulating compound 44 ensures, on the one hand, that the switching mechanism housing 16 is fixed in the switch housing 12. On the other hand, the insulating compound 44 ensures a mechanical seal that prevents liquids or contaminants from entering the inside of the switch 100 from the outside. This results in a sealed switch housing 12, in which the switching mechanism housing 16 is held captively.

A PTC component 46 is furthermore arranged in the switch housing 12. Said PTC component 46 is a PTC thermistor material, the electrical resistance of which increases as the temperature increases. The PTC component 46 has the form of a plate or disc. The PTC component 46 is inserted into the switch housing 12 and surrounds the stationary contact part 32.

The switching mechanism housing 16 rests with its first housing side 24 flat on the PTC component 46. The electrically conductive first base body 36 of the switching mechanism housing 16 is thus connected via the PTC component 46 to the electrically conductive second base body 38 of the switch housing 12.

An insulator 48 rests on the PTC component 46. Said insulator 48 is an annular body 50, which is arranged between the first base body 36 of the switching mechanism housing 16 and the second base body 38 of the switch housing 12 and lies on the two basic bodies 36, 38. More specifically, the annular body 50 of the insulator 48 lies with its inner side 52 on the housing circumferential side 28 of the switching mechanism housing 16 and lies with its outer side 54 on an inner circumferential surface 56 of the switch housing 12.

The insulator 48 is preferably a plastics insulator. In addition to its function of insulating the housing circumferential side 28 of the switching mechanism housing 16 from the inner circumferential surface 56 of the switch housing 12, the insulator 48 also ensures a correct alignment of the switching mechanism 10 relative to the switch housing 12 or the switching mechanism 10 relative to the stationary contact part 32. The shape of the annular body 50 of the insulator 48 is preferably adapted to the shape of the switch housing 12. The annular body 50 is therefore preferably a circular ring.

Since the second base body 38 of the switch housing 12 and the first base body 36 of the switching mechanism housing 16 are each made of electrically conductive material, thermal contact can be made via their outer surfaces to a device to be protected.

The outer surfaces of the two basic bodies 36, 38 also serve at the same time for the electrical connection of the switch 100. For example, the outside 58 of the second base body 38 of the switch housing 12 can thus act as a first electrical connection and the outside 60 of the first base body 48 of the switching mechanism housing 16 can act as a second electrical connection. More specifically, the outside 60 of that part of the base body 38 of the switching mechanism housing 16 which protrudes from the switch housing 12 can act as a second electrical connection.

Said part of the switching mechanism housing 16, which forms a freely accessible outside of the switch 100, comprises a domed portion 62 in the exemplary embodiment shown here. Said domed portion 62, the upper side of which is convex, ensures an extremely pressure-stable design of the switch 100. Instead of a domed portion 62, this portion of the switching mechanism housing 16 may also be pot-shaped.

In the low-temperature position of the switch 100 that is shown in FIG. 1, the temperature-independent snap-action spring disc 20 is in its first configuration and the temperature-dependent bimetallic snap-action disc 18 is in its low-temperature configuration. The snap-action spring disc 20 presses the movable contact part 22 against the stationary contact part 32, which acts as a mating contact. The switch 100 is thus in its closed position, in which an electrically conductive connection between the outside 60 of the switching mechanism housing 16 and the outside 58 of the switch housing 12 is produced via the snap-action spring disc 20, the movable contact part 22 and the stationary contact part 32.

The contact pressure between the movable contact part 22 and the stationary contact part 32 is produced by the snap-action spring disc 20. The snap-action spring disc 20 is supported in the low-temperature position of the switch 100 on an internal surface 64 arranged on the second housing side 26 in the interior of the switching mechanism housing 16. In this state, by contrast, the bimetallic snap-action disc 18 is mounted virtually without any force in the switching mechanism housing 16.

If the temperature of the device to be protected and thus the temperature of the switch 100 and of the bimetallic snap-action disc 18 arranged therein now increases to the switching temperature of the bimetallic snap-action disc 18 or above this switching temperature, the bimetallic snap-action disc 18 snaps over from its concave low-temperature configuration shown in FIG. 1 into its convex high-temperature configuration shown in FIG. 2. During said snapping-over, the bimetallic snap-action disc 18 is supported with its outer edge 66 on a supporting surface 68 arranged on the first housing side 24 of the switching mechanism housing 16. This means that the snap-action spring disc 20 is simultaneously deflected upwards at its centre such that the snap-action spring disc 20 snaps over from its first stable geometric configuration shown in FIG. 1 into its second geometrically stable configuration shown in FIG. 2.

FIG. 2 shows the high-temperature position of the switch 100, in which the latter is open. The electrically conductive connection between the switch housing 12 and the switching mechanism housing 16, which is undertaken in the low-temperature position of the switch 100 via the switching mechanism unit 14, is interrupted in the high-temperature position of the switch 100 that is shown in FIG. 2. The switch housing 12 is then "only still" connected to the switching mechanism housing 16 via the PTC component 46.

In the high-temperature position of the switch 100, the PTC component 46 already has a relatively high electrical resistance because of the high temperature. Thus, only a small residual current from the electrically conductive switch housing 12 can flow via the PTC component 46 into the electrically conductive switching mechanism housing 16. This residual current is harmless to the device to be protected. However, the residual current causes the PTC component 46 to heat up, as a result of which the entire switch 100 is heated up. Thus, the bimetallic snap-action disc 18 is also kept at a temperature above its switching temperature, and therefore the switch 100 is no longer closed via the switching mechanism unit 14.

Only when the device to be protected is de-energized, i.e. when there is no more current flowing via the switch 100, does the PTC component 46, and thus the entire switch 100, cool down. As soon as the switching mechanism unit 14 then reaches a temperature below the response temperature of the bimetallic snap-action disc 18, the bimetallic snap-action disc 18 then snaps over again from its high-temperature configuration shown in FIG. 2 into its low-temperature configuration shown in FIG. 1, as a result of which the switch 100 is closed again.

Finally, it should be noted that the snap-action spring disc 20 is not absolutely necessary. The switching mechanism unit 14 can also be realized without a snap-action spring disc 20. In such a case, the switching mechanism unit 14 then "only" comprises the bimetallic snap-action disc 18 and the movable contact part 22. The bimetallic snap-action disc 18 then not only ensures the switching behaviour of the switch 100, but also simultaneously generates the contact pressure between the movable contact part 22 and the stationary contact part 32 in the low-temperature position of the switch 100. The bimetallic snap-action disc 18 is then thus used as a live component of the switching mechanism 10.

What is claimed is:

1. A temperature-dependent switch, comprising:

a temperature-dependent switching mechanism having a switching mechanism unit, which comprises a movable contact part coupled to a bimetallic snap-action disc, and having a switching mechanism housing, in which the switching mechanism unit is arranged and held captively therein; and a switch housing, in which the switching mechanism housing is arranged and held captively therein, wherein the switch housing comprises a stationary contact part, which acts as a mating contact to the movable contact part, wherein the switching mechanism housing surrounds the switching mechanism unit from a first housing side, a second housing side opposite the first housing side, and a housing circumferential side extending between and transversely to the first and the second housing sides, wherein the switching mechanism housing on the first housing side comprises an opening through which the movable contact part interacts with the stationary contact part, wherein the switching mechanism housing comprises an electrically conductive first base body and the temperature-dependent switching mechanism is configured so as, below a response temperature of the bimetallic snap-action disc, to keep the temperature-dependent switch in a low-temperature position in which the temperature-dependent switching mechanism establishes a first electrical connection via the movable contact part between the electrically conductive first base body and the stationary contact part, and, if the response temperature is exceeded, to bring the temperature-dependent switch into a high-temperature position in which the temperature-dependent switching mechanism interrupts the first electrical connection, wherein the temperature-dependent switch further comprises a PTC component, which is electrically connected in parallel to the first electrical connection, and wherein the electrically conductive first base body forms a part of the second housing side of the switching mechanism housing, wherein the part of the second housing side forms a freely accessible outside of the temperature-dependent switch.

2. The temperature-dependent switch according to claim 1, wherein the PTC component is arranged in the switch housing.

3. The temperature-dependent switch according to claim 1, wherein the switch housing comprises an electrically conductive second base body, which is connected to the electrically conductive first base body via the PTC component, and wherein the electrically conductive second base body surrounds the first housing side and the housing circumferential side of the switching mechanism housing.

4. The temperature-dependent switch according to claim 3, comprising an insulator, which is arranged between the electrically conductive first base body and the electrically conductive second base body and which abuts the electrically conductive first base body and the electrically conductive second base body.

5. The temperature-dependent switch according to claim 4, wherein the insulator comprises an annular body, wherein an inner side of the annular body abuts the housing circumferential side of the switching mechanism housing, and wherein an outside of the annular body abuts an inner circumferential surface of the switch housing.

6. The temperature-dependent switch according to claim 5, wherein an underside of the annular body abuts the PTC component.

7. The temperature-dependent switch according to claim 1, wherein the first housing side of the switching mechanism housing abuts the PTC component.

8. The temperature-dependent switch according to claim 1, wherein the part of the second housing side of the switching mechanism housing which forms the freely accessible outside of the temperature-dependent switch comprises an outwardly arched, domed or pot-shaped portion.

9. The temperature-dependent switch according to claim 1, wherein the switching mechanism housing is integrally formed in one piece.

10. The temperature-dependent switch according to claim 1, wherein a diameter of the opening is smaller than a diameter of the bimetallic snap-action disc measured parallel to the diameter of the opening.

11. The temperature-dependent switch according to claim 1, wherein the bimetallic snap-action disc is configured to snap over from a geometrically stable low-temperature configuration into a geometrically stable high-temperature configuration when the response temperature is exceeded, and wherein the bimetallic snap-action disc is supported in its high-temperature configuration on a supporting surface, which is arranged on the first housing side of the switching mechanism housing and is formed on the electrically conductive first base body, and thereby keeps the movable contact part at a distance from the stationary contact part.

12. The temperature-dependent switch according to claim 1, wherein the switching mechanism unit further comprises a snap-action spring disc which is coupled to the movable contact part and is supported in the low-temperature position of the temperature-dependent switch on an internal surface arranged on the second housing side in an interior of the switching mechanism housing.

13. The temperature-dependent switch according to claim 1, wherein an intermediate space extending circumferentially between the switching mechanism housing and the switch housing is filled with insulating compound.

14. A temperature-dependent switch, comprising:

a temperature-dependent switching mechanism having a switching mechanism unit, which comprises a movable contact part coupled to a bimetallic snap-action disc, and having a switching mechanism housing, in which the switching mechanism unit is arranged and held captively therein;

a switch housing, in which the switching mechanism housing is arranged and held captively therein, wherein the switch housing comprises a stationary contact part, which acts as a mating contact to the movable contact part; and an insulator, wherein the switching mechanism housing surrounds the switching mechanism unit from a first housing side, a second housing side opposite the first housing side, and a housing circumferential side extending between and transversely to the first and the second housing sides, wherein the switching mechanism housing on the first housing side comprises an opening through which the movable contact part interacts with the stationary contact part, wherein the switching mechanism housing comprises an electrically conductive first base body and the temperature-dependent switching mechanism is configured so as, below a response temperature of the bimetallic snap-action disc, to keep the temperature-dependent switch in a low-temperature position in which the temperature-dependent switching mechanism establishes a first electrical connection via the movable contact part between the electrically conductive first base body and the stationary contact part, and, if the response temperature is exceeded, to bring the temperature-dependent switch into a high-temperature position in which the temperature-dependent switching mechanism interrupts the first electrical connection, wherein the temperature-dependent switch further comprises a PTC component, which is electrically connected in parallel to the first electrical connection, wherein the switch housing comprises an electrically conductive second base body, which is connected to the electrically conductive first base body via the PTC component, wherein the electrically conductive second base body surrounds the first housing side and the housing circumferential side of the switching mechanism housing, wherein the insulator is arranged between the electrically conductive first base body and the electrically conductive second base body and abuts the electrically conductive first base body and the electrically conductive second base body, and wherein the insulator comprises an annular body, wherein an inner side of the annular body abuts the housing circumferential side of the switching mechanism housing, and wherein an outside of the annular body abuts an inner circumferential surface of the switch housing.

* * * * *